(No Model.)
J. V. UPINGTON.
SULKY.
No. 255,055. Patented Mar. 14, 1882.
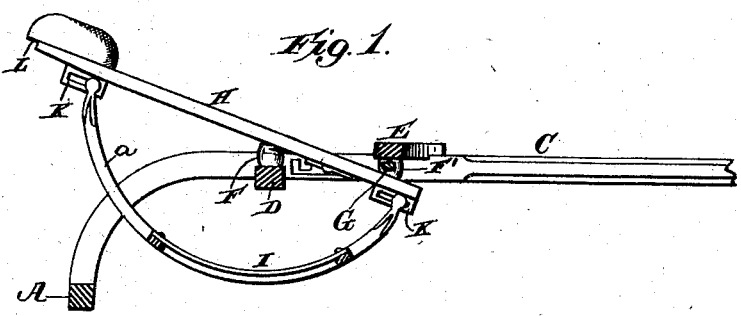
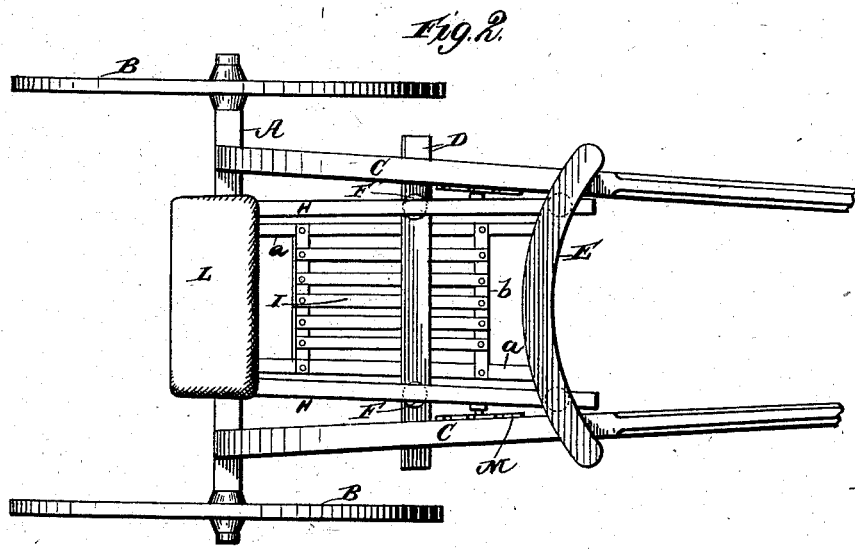
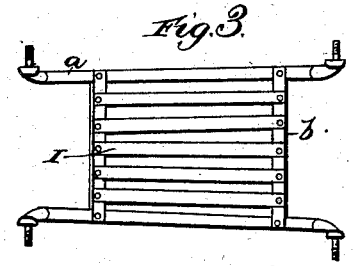
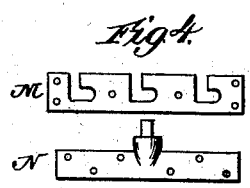
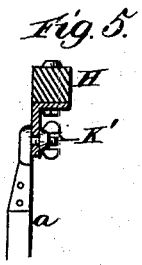
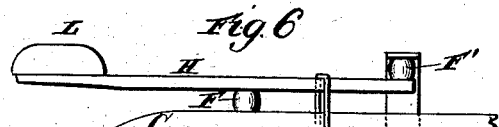
Witnesses.
Robert Enrett
J. A. Rutherford
Inventor.
John V. Upington.
By James L. Norris.
Atty

UNITED STATES PATENT OFFICE.

JOHN V. UPINGTON, OF LEXINGTON, KENTUCKY, ASSIGNOR OF ONE-HALF TO JAMES T. UPINGTON, OF SAME PLACE.

SULKY.

SPECIFICATION forming part of Letters Patent No. 255,055, dated March 14, 1882.

Application filed January 16, 1882. (No model.)

*To all whom it may concern:*

Be it known that I, JOHN V. UPINGTON, a citizen of the United States, residing at Lexington, Fayette county, State of Kentucky, have invented new and useful Improvements in Sulkies, of which the following is a specification.

The object of this invention is to improve the construction of sulkies and other two-wheeled vehicles having spring-seats and foot braces or platforms; and to this end the invention consists in the combination, with the shafts having front and rear cross-pieces provided with rubber cushions or springs, of spring-seat supports, the forward ends of which are arranged to bear upward against the springs or the under side of the front cross-piece and downward on the springs attached to the upper side of the rear cross-piece, and and adjustable foot brace or platform suspended beneath said seat-supports; and, further, in certain details of construction, as hereinafter more fully set forth.

In the accompanying drawings, Figure 1 is a sectional view. Fig. 2 is a plan. Fig. 3 is a view of foot-brace. Fig. 4 represents detail views of slotted plate and pivot-plate. Fig. 5 is a detail view, partly in section, and illustrates the mode of attaching the foot-brace to the inclined spring-supports for the seat. Fig. 6 is a modification showing a somewhat different mode of attaching the spring-supports for the seat.

In the drawings, A is the axle; B B, the wheels, and C C the shafts. These parts are made of suitable material in any well-known manner and form. The shafts are connected by cross-bars D E, which also afford an attachment for the rubber cushions or springs F F'. The rear cross-bar, D, which is straight in form, is secured to the under sides of the shafts in any suitable manner, and supports the rear cushions or rubber springs, F F, one being placed near each end, either within or to the outer sides of the shafts. The front cross-bar, E, which is placed above the shafts, is curved, its ends projecting forward, while its central portion approaches the rear bar, D, thus allowing the horse to be harnessed close to the body of the vehicle. To the under side of this cross-bar are attached the forward cushions or springs, F' F', which are placed near the ends of the same, but in line with the rear cushions, F F. The whiffletree G is attached to the forward cross-bar in the usual manner.

H H are the inclined seat-spring supports, to which is secured the suspended toe-board or foot-brace I by means of side attachments, K K', at their front and rear ends, the object being to so arrange said foot-board that it may be readily adjusted to secure the required distance between it and the seat for the accommodation of the occupant of the vehicle. This adjustment is accomplished by the employment of slotted plates K K, which are attached to the ends of the seat-spring supports H H by means of screws, clips, or, preferably, bolts and are arranged to receive the sliding bolts K' K' attached to the foot-brace I. This foot-brace consists of the longitudinal curved bars $a$ $a$ and cross-pieces $b$ $b$, the whole forming a light, durable frame, the parts of which are secured by bolts and rivets in any suitable manner. The seat-spring supports H H are preferably arranged within the shafts and in the spaces between the ends of the cross-bars D E. They thus bear downward upon the cushions or rubber springs F on the top of the rear cross-bar, D, and upward against the cushions or springs F' on the under side of the front cross-bars, E. The seat-board L is placed at the upper or rear end of the supports H H, and the foot-brace or curved frame I, which is adjustably secured to said supports, is arranged to pass below the rear cross-bar. I prefer to have the springs F F' and seat supports H H on the inner sides of the shafts C C, which are each formed of one piece, having the usual curved or sulky form, and attached to the axle; but the cross-pieces connecting the shafts may be extended to the outer sides of said shafts, thus allowing the cushions or springs F F' and seat-supports H to be placed in like position, the same result being attained in either case.

About midway between the forward and rear springs, F and F', and attached to each shaft, is a slotted plate, M, which engages with a pivot-plate, N, secured to the under side of the seat-spring supports H H. This prevents the seat-supports from slipping either backward or forward and allows a free play to the back and front spring-cushions. By means of the series of slots or notches in the plate M the supports H H and attached frame I may also be adjusted forward or back, as may be required.

It will be observed that the plates M N and cross-bars D E afford a secure support for the seat-spring supports H H and frame or foot-brace I. The yielding-pressure of the seat-supports H H against the springs on the bars D E obviates the objectionable effects of jar or strain, and the vehicle is thus rendered more easy and resilient when in motion, even if drawn rapidly over an uneven road, the seat and foot-brace partaking alike of the elastic action of the springs.

Sulkies have heretofore been provided with inclined seat-supporting arms having their lower ends adjustably connected with the shafts, and also with a foot-rest suspended at one end from the seat-supporting arms and at the other end secured to the shafts; but such features are not broadly claimed by me.

What I claim as new, and desire to secure by Letters Patent, is—

1. In a sulky or two-wheeled vehicle having shafts attached to the axle, the combination, with cross-pieces connecting said shafts and provided with rubber cushions or springs, of seat-spring supports, the forward ends of which bear upward against the springs on the forward cross-piece and downward on the springs attached to the rear cross-piece, and an adjustable foot-brace attached to said seat-supports, substantially as shown and described.

2. In a sulky, the combination, with shafts connected by cross-pieces and provided with slotted plates, of spring-seat supports having an adjustable foot-brace attached thereto and provided with pivot-plates adapted to engage with the slotted plates on the shafts, whereby the seat-supports and foot-brace may be adjustably secured in any desired position, substantially as shown and described.

3. In a sulky, the combination, with the shafts having suitable front and rear cross-bars and provided with plates having a series of slots or notches, of spring-seat supports arranged to bear upward against the front cross piece and downward on the rear cross-piece, and provided with pivot-plates adapted to engage with the slotted plates on said shafts, whereby the supports may be adjusted forward or back, substantially as shown and described.

4. In a sulky, the combination, with the spring seat supports H H, having slotted plates K K, of the suspended foot-brace I, having sliding bolts K' K', whereby said foot brace or support may be adjusted to regulate the distance between it and the seat, substantially as shown and described.

5. In a sulky, the combination, with the shafts C C, connected by cross-pieces D E, and having slotted plates M and springs F F', of the spring-seat supports H H, having pivot-plates N, adapted to engage with the slotted plates on the shafts, and an adjustable foot-brace, I, consisting of curved bars $a$ $a$ and cross-pieces $b$ $b$, substantially as shown and described.

In testimony whereof I have hereunto set my hand in the presence of two subscribing witnesses.

JOHN V. UPINGTON.

Witnesses:
LOUIS MEYERS,
W. C. STANDEFORD.